United States Patent [19]

Mahoney et al.

[11] 4,197,819
[45] Apr. 15, 1980

[54] HOT FUEL GAS GENERATOR

[75] Inventors: Fred G. Mahoney, Pittsburgh, Pa.; Webster B. Harpman, Poland, Ohio

[73] Assignee: Econo Fuel Systems, Inc., Latrobe, Pa.

[21] Appl. No.: 964,644

[22] Filed: Nov. 29, 1978

Related U.S. Application Data

[63] Continuation-in-part of Ser. No. 762,101, Jan. 24, 1977, Pat. No. 4,145,998, which is a continuation-in-part of Ser. No. 710,195, Jul. 30, 1976, Pat. No. 4,050,419.

[51] Int. Cl.$^2$ .............................................. F02B 43/00
[52] U.S. Cl. .............................. 123/25 B; 123/122 F; 123/133; 123/25 P
[58] Field of Search ............... 123/122 E, 122 F, 133, 123/34 A, 122 H, 25 B, 25 E, 25 P, 25 N, 3

[56] References Cited

U.S. PATENT DOCUMENTS

| | | | |
|---|---|---|---|
| 916,003 | 3/1909 | Osborn | 123/122 E |
| 1,925,032 | 8/1933 | Dunner | 123/122 E |
| 3,472,214 | 10/1969 | Moon | 123/122 E |
| 4,005,683 | 2/1977 | Whitt | 123/122 E |
| 4,023,538 | 5/1977 | Harpman et al. | 123/122 F |
| 4,050,419 | 9/1977 | Harpman et al. | 123/122 F |
| 4,106,457 | 8/1978 | Totten et al. | 123/122 E |
| 4,112,889 | 9/1978 | Harpman | 123/122 F |
| 4,114,566 | 9/1978 | Harpman et al. | 123/122 F |
| 4,142,481 | 3/1979 | Minoza | 123/133 |
| 4,145,998 | 3/1979 | Mahoney et al. | 123/122 F |

*Primary Examiner*—Ira S. Lazarus
*Attorney, Agent, or Firm*—Webster B. Harpman

[57] ABSTRACT

A hot fuel gas generator for an internal combustion engine simultaneously vaporizes gasoline and water in a multi-chambered heated pressure vessel having built in regulators for controlling pressure and volume and delivers the resulting superheated steam and gaseous fuel to the intake manifold of the internal combustion engine downstream from the usual air cleaner. A single device operating at a high temperature, for example 800° F., is used for the simultaneous vaporization of the fuel and water to develop desirable working pressure and volume. The high temperature steam and gaseous fuel positions the fuel molecules at the greatest degree of separation from each other providing the greatest opportunity for contact of the oxygen, the reacting species in the gaseous condition as chemical reactions occur only between particles at the atomic or molecular level and it is necessary for the reacting species to be in actual contact at the time of reaction. The hot fuel gas produced therefore enables complete combustion and the elimination of the atmospheric pollutants common in the operation of internal combustion engines and increases the energy obtained from the fuel.

8 Claims, 6 Drawing Figures

HOT FUEL GAS GENERATOR

BACKGROUND OF THE INVENTION (1) Field of the Invention

This invention relates to fuel systems and vaporizing devices therein for internal combustion engines, and more particularly fuel gas generators.

(2) Description of the Prior Art

Fuel systems for internal combustion engines have generally used carburetors in which gasoline is sprayed into a stream of air and divided into a series of fine droplets approaching vaporization and conveyed to the point of combustion. Only those molecules at the surface of the gasoline droplets are in a position to react with another species and incomplete combustion results because the very short time allowed is insufficient for more than a little vaporization of the fuel to occur. The prior art engines therefore exhaust large quantities of unburned hydrocarbons, carbon monoxide and oxides of nitrogen, all of which are undesirable atmospheric pollutants. Several attempts to improve vaporization may be seen in U.S. Pat. Nos. 1,110,482; 2,585,171; 2,285,905 and 2,272,,341.

This invention simultaneously vaporizes the liquid fuel and water at high temperatures so that the fuel mixture in its heated pressurized gaseous state achieves practically complete combustion in the internal combustion engine due to the spacing of the molecules resulting from the heat and the superheated steam.

SUMMARY OF THE INVENTION

A hot fuel gas generator having a novel high temperature and pressure controlled heated vaporizer is disclosed in which gasoline and water are simultaneously vaporized to produce a hot gaseous fuel under pressure and regulated as to temperature volume and flow is in direct communication with the inlet manifold of the engine. A throttle valve and linkage controls the combustion air and a valve in the generator controls the hot fuel gas flow to the intake manifold and is actuated by the throttle valve linkage. The partial vacuum resulting from the operation of the internal combustion engine moves the combustion air with the hot gaseous fuel from the generator to the areas of combustion in the engine. The complete vaporization of the liquid fuel and the water is caused by high temperature heat from an external source under controlled pressure and volume conditions. Gasoline or other fuel in a ratio of 80% to 95% to water 5% to 20% makes a highly satisfactory hot gaseous fuel.

DESCRIPTION OF THE PREFERRED EMBODIMENT

Figure 1:
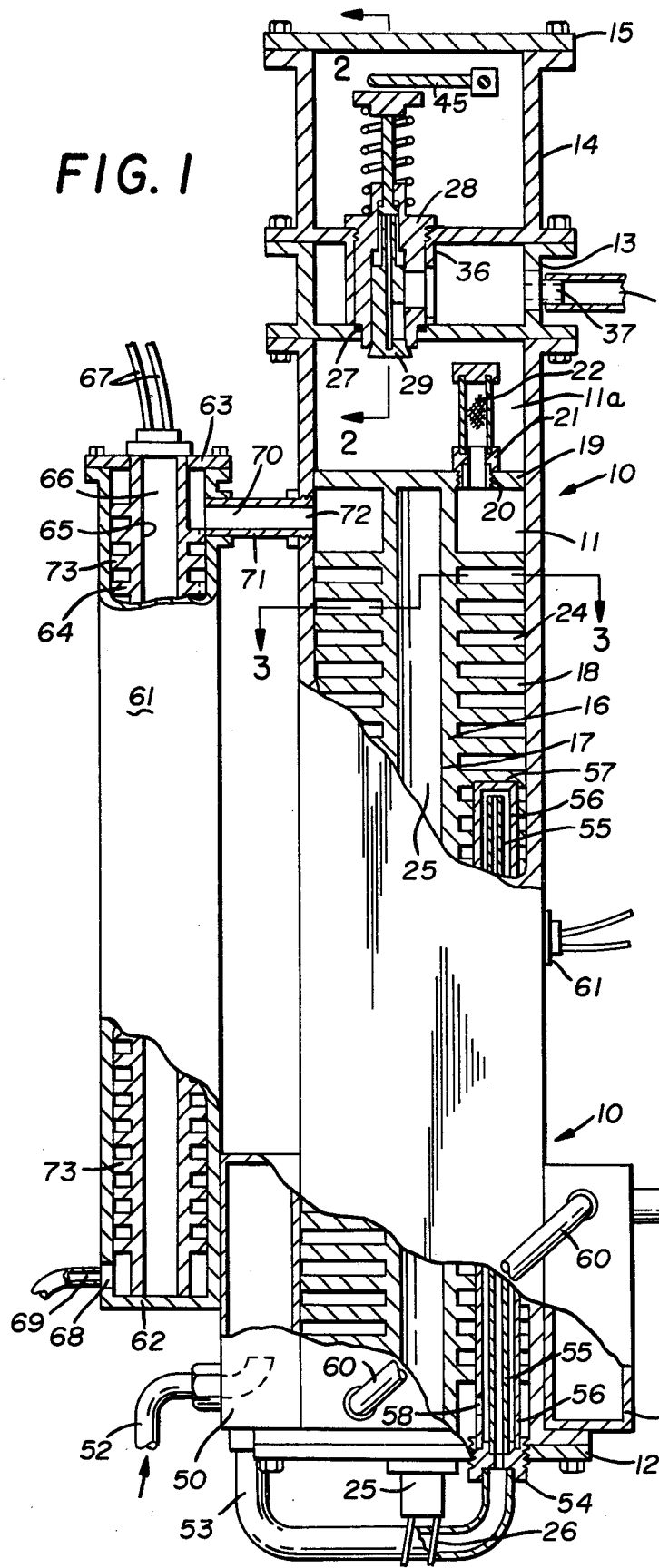
FIG. 1 is a cross sectional side elevation of the hot fuel gas generator.

By referring to the drawings and FIG. 1 in particular, it will be seen that the hot fuel gas generator comprises a multi-chambered pressure vessel in the form of a hollow body member generally indicated by the numeral 10, the main portion of which has a heat exchange chamber 11 therein. A bottom closure 12 closes the bottom end of the heat exchange chamber 11 and a secondary hollow body member 13 is secured to the upper end of the body member 10 and a third hollow body member 14 is secured to the upper end of the secondary hollow body member 13. An upper closure 15 is affixed to the upper end of the third hollow body member 14. An integral multiple finned heat exchanger 16 is positioned in the heat exchange chamber 11 and it defines a central tubular cavity 17 surrounded by a plurality of vertically spaced integral fins 18 which extend from a location spaced with respect to the lower end of the central tubular cavity 17 to a point near the upper end thereof. The upper end of the heat exchanger 16 has a top portion 19 which is apertured as at 20 to receive a fitting 21 which in turn mounts a filter 22. By referring to FIGS. 1 and 3, it will be seen that each of the integral fins 18 has a corner thereof cut away as at 23 with the cut away corners alternating in oppositely disposed relation so that a tortuous passageway is created by establishing communication with the spaces 24 between each of the vertically spaced fins 18. The fins 18 substantially fill the heat exchanger chamber 11.

An electrically energized heating element 25 is positioned in the cavity 17 which extends vertically throughout the length of the multiple finned heat exchanger 16. The lower end of the heating element 25 extends through an aperture in the bottom closure 12 and electrical conductors 26 extend therefrom as hereinafter described.

Still referring to FIG. 1 of the drawings, it will be seen that the secondary hollow body member 13 is apertured as at 27 to receive a valve body 28 which in turn has a valve element 29 mounted therein for vertical movement. The valve element 29 which may be seen in greater detail in FIG. 2 of the drawings, has a closed bottom end and a hollow interior defining a passageway 30. The upper portion of the valve element 29 is of reduced diameter to create a chamber 31 thereabout and within the upper portion of the valve body 28. Openings 32 in the upper portion of the valve element 29 establish communication between the passageway 30 therein and the chamber 31. A vertical slot 33 is formed in the lower portion of the valve element 29 inwardly from the lower end thereof and is in communication with the vertical passageway 30, the arrangement being such that when the valve element 29 is moved downwardly from the position seen in FIG. 2, the slot 33 will begin to clear the lower end of the valve body 28 and permit flow of fuel gas from the upper end 11A of the heat exchanger chamber 11 to flow into the vertical passage 30 and outwardly through the openings 32 into the chamber 31. A secondary vertical slot 34 in the valve body 28 inwardly of the ends thereof is positioned so that when the valve element 29 has moved downwardly as hereinafter described, the chamber 31 is extended downwardly and comes into communication with the secondary vertical slot 34 whereupon gaseous fuel can flow therethrough and through an opening 35 in a partition 36 in the secondary hollow body member 13. A dual valve is thus provided.

Figure 6:
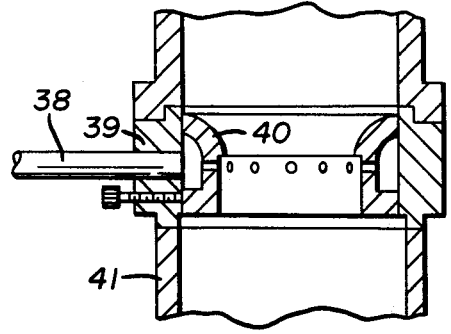
FIG. 6 is a cross sectional side view of a fuel introducing fitting used in the fuel system of FIG. 5.

An apertured fitting 37 in a side wall of the secondary hollow body member 13 establishes communication with a tube 38, see FIG. 1, which extends to a fitting 39, see FIG. 6, which incorporates a Venturi 40 positioned immediately adjacent in inlet manifold 41 of an internal combustion engine.

Figure 4:
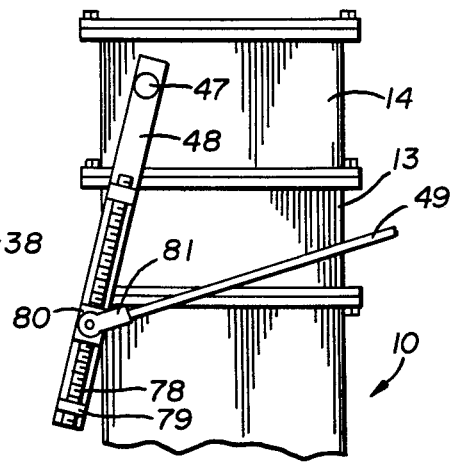
FIG. 4 is a back elevation of a portion of FIG. 1.
Figure 2:
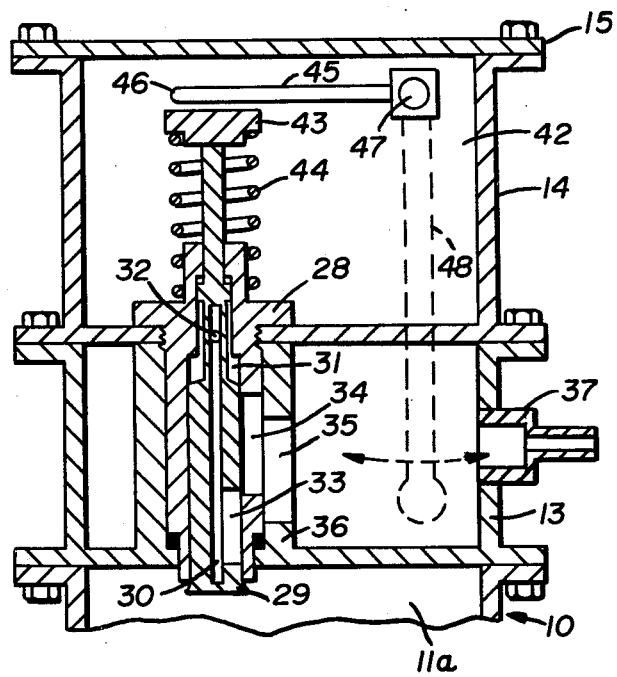
FIG. 2 is an enlarged cross sectional detail on line 2—2 of FIG. 1.

Still referring to FIGS. 1 and 2 of the drawings, it will be seen that the upper end of the valve element 29 extends vertically into a third chamber 42 defined by the third hollow body member 14 and the top closure 15 heretofore referred to and it is provided at its uppermost end with a button 43 which positions a spring 44 between the same and the upper surface of the valve body 28. The spring 44 normally biases the valve element 29 upwardly to a closed position with respect to both of the valve passageways therethrough as seen in FIG. 2 of the drawings. An arm 45 has its free end 46 positioned for sliding engagement with the upper surface of the button 43 and is attached at its other end to a shaft 47 which extends outwardly of the third hollow body member 14 and the outer end of the shaft 47 has a depending secondary arm attached thereto as seen in FIG. 4 of the drawings so that movement from the throttle linkage of the internal combustion engine as hereinafter described, imparted the secondary arm 48 by linkage 49 will actuate the valve element 29.

By referring again to FIG. 1 of the drawings, it will be seen that a pair of liquid receivers 50 and 51 are mounted in heat exchanging relation against the outer sides of the hollow body member 10. The liquid receiver 50 is apertured and provided with a fitting 52 by which water is delivered from a suitable source under a suitable pressure, for example a water tank holding two gallons more or less and a pump means for delivery the water to the liquid receiver 50 at approximately 2 PSI pressure. A U-shaped tubular fitting 53 extends from the bottom of the liquid receiver 50 to and communicates with a water delivery fitting 54 in the bottom closure 12, the inner or upper portion of which mounts a pair of vertically extending tubes 55 and 56 respectively. The tube 55 is positioned within the tube 56 and is shorter than the tube 56 so that its upper end is spaced with respect to an upper end closure 57 on the tube 56. Thus water delivered from the liquid receiver 50 through the U-shaped tubular fitting 53, flows upwardly through the tube 55 out of its upper end and downwardly inside the tube 56 and out of the lower portion thereof through an opening 58 which communicates with the lower portion of the heat exchange chamber 11. The tubes 55 and 56 are appropriately sized to provide a desirable metering action to insure the delivery of only the desirable amount of water to the hot fuel gas generator.

Still referring to FIG. 1 of the drawings, it will be seen that the liquid receiver 51 has an inlet fitting 59 in communication with the same through which gasoline or any other liquid hydrocarbon is delivered to the liquid receiver 51. A pump such as the fuel pump on a conventional automobile engine is arranged to deliver the gasoline or other liquid hydrocarbon at a pressure of substantially 8 PSI. Gasoline entering the liquid receiver 51, like the water entering the liquid receiver 50, is heated by its association with the heated hollow body member 10 and the gasoline flows from the liquid receiver 51 through a secondary U-shaped tubular fitting 60, the other end of which communicates with the lower portion of the hollow body member 10 and the heat exchange chamber 11 therein.

It will thus be seen that water and gasoline or any other liquid hydrocarbon are delivered to the bottom portion of the heat exchange chamber 11 in the hollow body member 10 of the device, and a desirable ratio has been determined to be between 5% to 20% water and 80% to 95% gasoline or other liquid hydrocarbon.

The heating element 25 which is electrically actuated as hereinbefore described, is adapted to operate at a surface temperature of between 700° F. and 800° F. and since it is intimate contact with cavity 17 in the multiple finned heat exchanger 16, the fins 18 operate at a temperature between 500° F. and 700° F. which is suitable for simultaneously vaporizing water and gasoline in the device.

A control thermostat 61 is positioned in the heat exchange chamber 11 and serves to control the operation of the heating element 25 as will be understood by those skilled in the art.

It will thus be seen that water and gasoline or another liquid hydrocarbon, such as diesel fuel, furnace oil, kerosene, or the like delivered to the bottom portion of the heat exchange chamber 11 of the device, must flow upwardly in a tortuous passageway formed by the multiple vertically spaced fins 18 which have cut away oppositely disposed corners alternately in the arrangement. During the upward flow of the water and liquid hydrocarbon, they are both vaporized and the hereinbefore mentioned advantages of wide molecular separation occurs. The hot fuel gas then flows through the aperture 20 in the top portion 19 of the multiple finned heat exchanger 16 through the filter 22 and into the upper portion 11A of the heat exchange chamber 11. It is then controlled by the valve element 29, which as hereinbefore described, is directly controlled by linkage to the throttle linkage of the internal combustion invention on which the device is installed.

In order that an automotive engine equipped with the device of the invention can be started when cold, an auxiliary vaporization device is provided and placed in communication with the heat exchange chamber 11 hereinbefore described. Still referring to FIG. 1 of the drawings, it will be seen that the auxiliary vaporization device comprises a hollow body member 61 which has a closed lower end 62 and an apertured closure 63 on its upper end. A secondary multiple finned heat exchanger 64 is positioned in the hollow body member 61 of the auxiliary vaporization device and like the multiple finned heat exchanger 16 hereinbefore described, defines a central tubular cavity 65 in which an electrically actuated heating element 66 is positioned. Electrical conductors 67 of the heating element 66 extend to a suitable power supply as hereinafter described. An inlet opening 68 is positioned in the bottom portion of the hollow body member 61 and an inlet fitting 69 is in communication therewith and is controlled by a solenoid valve or the like and it extends to a source of gasoline or other liquid hydrocarbon, such as the fuel pump of an automobile engine.

Figure 3:
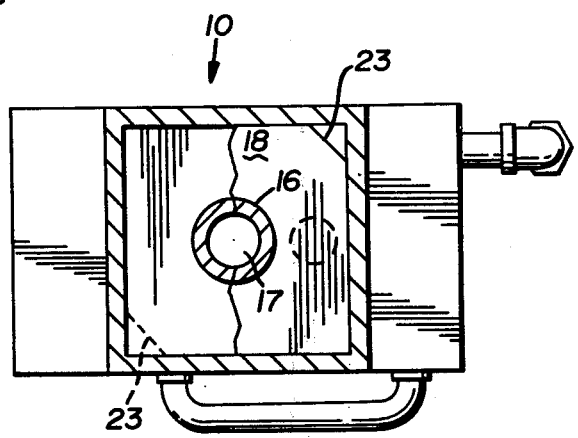
FIG. 3 is a horizontal section on line 3—3 of FIG. 1.

An outlet opening 70 is formed in the upper portion of the hollow body member 61 and a tube 71 establishes communication between the outlet opening 70 and an inlet opening 72 in the hollow body member 10 and in direct communication with the upper portion of the heat exchange chamber 11 and immediately below the top portion 19 of the multiple finned heat exchanger 16 therein. The opposite corners of fins 73 on the secondary heat exchanger 64 are cut away in exactly the same manner as the opposite corners are cut away at 23 in the fins 18 of the multiple finned heat exchanger 16 as illustrated in FIG. 3 of the drawings so that a tortuous passageway is formed upwardly from the bottom 62 of the auxiliary vaporization device to the upper end thereof.

The hollow body member 61 is largely filled by the secondary heat exchanger 64 and its plurality of vertically spaced fins and the remaining area holds an ounce or less of gasoline or other liquid hydrocarbon. Actuation of the heating element 66 occurs simultaneously with the actuation of the heating element 25 hereinbefore referred to as upon turning the ignition key and engaging the starter in the automobile engine equipped with the device. Substantially instantaneous vaporization of the small amount of liquid hydrocarbon in the auxiliary vaporization device formed by the hollow body member 61 occurs and the vaporized gasoline or other liquid hydrocarbon flows immediately into the upper portion of the heat exchange chamber 11 upwardly through the filter 22 and through the valve body 28 when the valve element 29 is moved responsive to movement of the throttle linkage by the accelerator peddle in the automobile. The hot vaporized gasoline flows immediately into the intake manifold 41 of the engine of the automobile and the same thereby starts instantly. Within a minute, more or less, the main heating element 25 has began producing the hereinbefore described mixture of steam and gasoline vapor which then flows by the same passageways to the internal combustion engine and suitable temperature sensors disconnect the heating element 26 of the auxiliary vaporization device.

Figure 5:
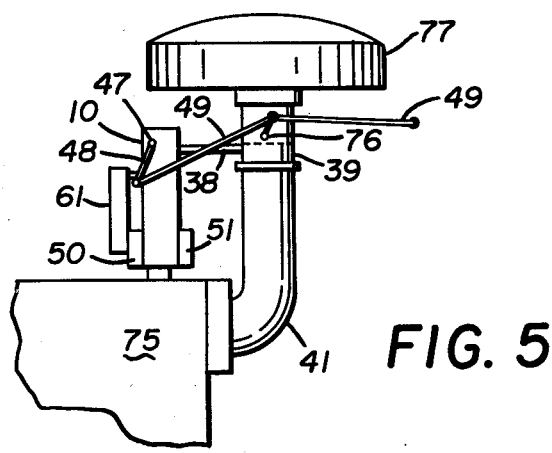
FIG. 5 is a diagrammatic illustration of a fuel system and an internal combustion engine and incorporating the generator of FIG. 1.

By referring now to FIG. 5 of the drawings, it will be seen that a block diagram represents an internal combustion engine 75 having an inlet manifold 41 which extends upwardly and mounts the fitting 39 by which the hot fuel gas from the device of the invention is delivered thereto. The hot fuel gas enters the fitting 39 by the pipe 38 which communicates with the hollow body member 10 as hereinbefore described. The combustion air is controlled by a conventional throttle valve 76 which is located below an air cleaner 77, the throttle valve 76 having linkage 49 which extends to the secondary arm 48 of the hot fuel gas generator and to the accelerator pedal of the automobile in which the internal combustion engine is located. The arrangement is such that the movement of the accelerator moves the linkage 49 and simultaneously opens and closes the throttle valve 76 controlling the main combustion air and the valve element 29 in the generator which controls the hot fuel gas. In order that a desirable ratio can be established, the secondary arm 48 is provided with an adjustable connection means for the throttle linkage 49 as best seen in FIG. 4 of the drawings, and by referring thereto it will be seen that a threaded shaft 78 is mounted on brackets 79 on the secondary arm 48 and an apertured block 80 is engaged thereon. The apertured block 80 pivotally mounts a fitting 81 which is secured to the end of the throttle linkage 49. Rotation of the threaded shaft 78 will accordingly provide a desirable adjustment between the throttle linkage 49 and the valve in the generator and will provide for an idling setting, as will occur to those skilled in the art.

By referring again to FIG. 6 of the drawings, it will be seen that the hot fuel gas delivered to the fitting 39 by the pipe 38 from the generator of the invention, flows into the upper end of the inlet manifold 41 by way of circumferentially spaced apertures in the Venturi 40 in the fitting 39.

In the present disclosure the combustion air throttle valve has been referred to as being located above the fitting in which the hot fuel gas is delivered to the inlet manifold and it will occur to those skilled in the art that it can alternately be located therebelow if desired.

A modification in the means of delivering and metering the water and the gasoline or other liquid hydrocarbon to the device may be made and for example the tubes 55 and 56 hereinbefore described in FIG. 1 of the drawings as providing a metering control of the water introduced into the heat exchange chamber 11 may be dispensed with and the water delivered directly into the lower portion of the heat exchange chamber 11 by utilizing the water delivery fitting 54 as a metering device. As illustrated and hereinbefore described, the multiple fins 18 are provided with a series of registering drilled openings for the reception of the tube 56 in intimate relation to the fins 18 so that heat exchange would take place between the fins 18 and the tube 56.

A still further change may be made in the manner in which the water and the liquid fuel are delivered to the liquid receivers 50 and 51 and delivered therefrom to the heat exchange chamber 11. Direct communicating passages may be substituted for the U-shaped tubular members 53 and 60 respectively.

Those skilled in the art will observe that negative pressures existing in the inlet manifold 41 as a result of the movement of the pistons in the cylinders of the internal combustion engine 75 extend by way of the fitting 39 to the interior of the secondary hollow body member 13 so that the hot fuel gas generated by the device of the invention will move directly into the cylinders of the engine 75.

OPERATION

Operating an internal combustion engine with the device of the invention in a fuel system as described herein, requires only actuating the ignition switch and starter of the engine whereupon the heating elements 66 and 25 are energized. Simultaneously variable delivery pumps, not shown, and which may be combined in a single unit, move water and gasoline or another liquid hydrocarbon into the liquid receivers 50 and 51 and the hollow body member 61. The very small capacity of the hollow body member 61 results in the instant vaporization of the gasoline delivered thereto which then flows as hereinbefore described into the engine so that the same starts immediately even when cold. The water and gasoline or other liquid fuel being delivered to the hollow body member 10, are simultaneously vaporized as they move upwardly in the tortuous passageway formed by the vertically spaced fins 18 and the resulting hot fuel gas is made available in suitable quantities for operating the engine under all driving conditions. It will thus be seen that the hot fuel gas generator disclosed herein comprises a substantial improvement over the prior art devices in that cold start capabilities are realized and ample volume of hot fuel gas is made available and direct control of the fuel gas is linked to the throttle linkage which simultaneously controls the combustion air throttle valve of the engine.

Tests of conventional automobiles and engines equipped with the hot fuel gas generator disclosed herein show near zero levels of atmospheric pollutants in the exhaust, which eliminates the need of any catalytic converters or other devices which attempt to treat the effect and not the cause.

The tests also indicate a substantial increase in miles per gallon obtained from the hot fuel gas generated by the device of the invention as compared with the same amount of fuel supplied the same engine in the same vehicle through a conventional carburetor. For example a 1977 six-cylinder Ford Granada achieves between 38 and 45 miles per gallon of gasoline under various road conditions and loads as compared with its EPA rating of 16 to 20 miles per gallon.

The conductors 26 and 67 extend to the usual battery and/or alternator and have switches to control the energization of the heating elements 25 and 66 respectively. The switches are controlled by the ignition switch and/or temperature responsive devices in the heat exchange chamber 11. It has been determined that the device of the invention will operate with a reasonable degree of efficiency when it is supplied with only gasoline or another liquid hydrocarbon. The anti-knock qualities which are obtained through the addition of the water as aforesaid are lost and the unburned hydrocarbon emissions and carbon monoxide are increased somewhat without the additional molecular spread of the hydrocarbon which is obtained by the superheated steam in the preferred embodiment of the invention.

Although but one embodiment of the present invention has been illustrated and described, it will be apparent to those skilled in the art that various changes and modifications may be made therein without departing from the spirit of the invention and having thus described our invention what we claim is:

We claim:

1. A generator for producing hot fuel gas for an internal combustion engine having an intake manifold, a throttle valve therefore, an accelerator and linkage connecting said accelerator to said throttle valve; said generator comprising a closed pressure vessel, a heat exchanger in said vessel, heating means in said heat exchanger, fins on said heat exchanger, said fins extending to the walls of said pressure vessel and having staggered openings in said fins to form a passageway, means for continuously injecting a predetermined amount of a liquid hydrocarbon into said pressure vessel, a valve positioned in an opening in said pressure vessel, means establishing communication between said valve and said intake manifold, means for moving said valve from a closed position to an open position, said means for moving said valve connected to said linkage and arranged to move said valve simultaneously with said throttle valve.

2. The generator set forth in claim 1 and wherein separate means is provided for continuously injecting a predetermined amount of water into said closed pressure vessel.

3. The generator set forth in claim 1 and wherein separate means is provided for continuously injecting a predetermined amount of water into said pressure vessel and wherein said means for injecting said liquid hydrocarbon and said means for injecting said water deliver hydrocarbon and water adjacent one end of said heat exchanger and said valve is positioned adjacent the opposite end of said heat exchanger.

4. The generator set forth in claim 1 and wherein said heating means comprises an electric resistance heating element positioned in a bore in said heat exchanger and wherein means is provided for energizing said heating means to maintain temperatures between 500° F. and 800° F.

5. The generator set forth in claim 1 and wherein said pressure vessel is tubular and of a uniform inner diameter in the area of said heat exchanger.

6. The generator set forth in claim 2 and wherein said means for continously injecting said liquid hydrocarbon and said water operate simultaneously and wherein temperature responsive means in said pressure vessel is arranged to control said heating means.

7. A generator for producing hot fuel gas for an internal combustion engine having an intake manifold, a throttle valve and an accelerator with linkage connecting said accelerator to said throttle valve, said generator comprising a closed pressure vessel, at least a portion of which is of a tubular configuration, a heat exchanger disposed in said pressure vessel in the tubular configuration thereof, said heat exchanger having a chamber formed therein and a plurality of spaced fins thereon, the area of said spaced fins susbstantially matching the area of said tubular portion of said pressure vessel, electric resistance heating means in said chamber in said heat exchanger, means for energizing said heating means to generate and maintain temperatures between 500° F. and 800° F. in said heat exchanger, separate means for simultaneously continuously injecting predetermined amounts of a liquid hydrocarbon and water into said closed pressure vessel adjacent one end of said heat exchanger, passageways formed in said fins in oppositely disposed relation in alternate fins so as to create a tortuous passageway in said pressure vessel incorporating the areas between said spaced fins, at least one partition in said pressure vessel dividing said vessel into at least first and second chambers in adjacent relation, said heat exchanger being located in the first one of said chambers, a valve positioned in an opening in said partition, means for moving said valve from a closed position to an open position, said means for moving said valve connected to said throttle valve linkage for actuation thereby, and means establishing communication between said second chamber and said intake manifold.

8. The generator set forth in claim 7 and wherein a secondary closed pressure vessel of relatively smaller size than said first mentioned closed pressure vessel is positioned adjacent said first mentioned closed pressure vessel, means establishing communication between said secondary closed pressure vessel and said first mentioned pressure vessel, a secondary heat exchanger disposed in said secondary closed pressure vessel, said secondary heat exchanger having a chamber formed therein and a plurality of spaced fins thereabout, electric resistance heating means in said secondary heat exchanger, means for energizing said heating means in said secondary heat exchanger to generate and maintain temperatures between 500° F. and 800° F. in said heat exchanger, means for injecting predetermined amounts of a liquid hydrocarbon into said secondary pressure vessel adjacent one end of said secondary heat exchanger, passageways formed in said fins in oppositely disposed relation in alternate fins so as to create a tortuous passageway in said secondary pressure vessel incorporating the areas between said spaced fins of said secondary heat exchanger, said secondary pressure vessel arranged to hold approximately one ounce of a liquid hydrocarbon whereby energization of said electric resistance heating means in said secondary heat exchanger results in practically instantaneous vaporization of said liquid hydrocarbon and the delivery thereof to said first mentioned pressure vessel.

* * * * *